(12) United States Patent
Tsuihiji et al.

(10) Patent No.: US 11,367,229 B2
(45) Date of Patent: Jun. 21, 2022

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Yuki Tsuihiji, Yokohama (JP); Yohei Fujitani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/930,689

(22) Filed: May 13, 2020

(65) Prior Publication Data

US 2020/0364912 A1  Nov. 19, 2020

(30) Foreign Application Priority Data

May 16, 2019 (JP) .............................. JP2019-093200
May 16, 2019 (JP) .............................. JP2019-093201

(51) Int. Cl.
*G06T 11/60* (2006.01)
*G06F 16/54* (2019.01)
*H04N 9/82* (2006.01)

(52) U.S. Cl.
CPC .............. *G06T 11/60* (2013.01); *G06F 16/54* (2019.01); *H04N 9/8205* (2013.01)

(58) Field of Classification Search
CPC ..................................................... G06T 11/60
See application file for complete search history.

(56) References Cited

U.S. PATENT DOCUMENTS

| 2009/0122134 A1 | 5/2009 | Joung et al. |
| 2017/0278263 A1 | 9/2017 | Tanaka et al. |
| 2017/0359524 A1* | 12/2017 | Hosono ................ H04N 9/8205 |
| 2019/0206013 A1* | 7/2019 | Okuyama .......... H04N 5/23238 |

FOREIGN PATENT DOCUMENTS

| CN | 101827214 A | 9/2010 |
| CN | 101867706 A | 10/2010 |
| CN | 103037235 A | 4/2013 |
| CN | 104243798 A | 12/2014 |
| CN | 107493423 A | 12/2017 |
| CN | 109417598 A | 3/2019 |
| EP | 2124458 A1 | 11/2009 |
| JP | 2012-094978 A | 5/2012 |
| JP | 2019033308 A | 2/2019 |
| WO | 2017/221659 A1 | 12/2017 |

* cited by examiner

*Primary Examiner* — Daniel T Tekle
(74) *Attorney, Agent, or Firm* — Canon U.S.A., Inc. IP Division

(57) ABSTRACT

An image processing apparatus includes a combining unit configured to combine a plurality of images to generate a combined image, and a control unit configured to record the combined image generated by the combining unit on a recording medium, and configured to: if the combined image, generated by the combining unit, is generated by combining a plurality of captured images, and: if the combined image satisfies a predetermined condition, attach first type data to the recorded combined image, and if the combined image does not satisfy the predetermined condition, attach second type data to the recorded combined image. If the combined image, generated by the combining unit, is generated by combining a plurality of captured images recorded on the recording medium, the second type data is attached regardless of whether the predetermined condition is satisfied.

9 Claims, 8 Drawing Sheets

FIG.3

COMBINING INFORMATION SECTION — 2091

301 — IMAGE IDENTIFICATION INFORMATION = IMAGING TIME OBTAINED COMBINED IMAGE ("3")

SOURCE IMAGE NUMBER INFORMATION — 303

- NUMBER OF CAPTURED IMAGES = 6
- NUMBER OF IMAGES THAT HAVE BEEN COMBINED = 4
- USED IMAGE NUMBERS = {1, 2, 4, 5}

COMBINED IMAGE INFORMATION — 304

- STATISTIC OF EXPOSURE TIME = 1s
- STATISTIC OF APERTURE VALUE = 5.6
- STATISTIC OF ISO SPEED = 6400
- STATISTIC OF FOCAL LENGTH = 50 mm
- ⋮

SOURCE IMAGE INFORMATION ABOUT COMBINED IMAGE — 305

IMAGING PARAMETERS OF CAPTURED IMAGE 1
- EXPOSURE TIME = 1/125s
- APERTURE VALUE = 5.6
- ISO SPEED = 800
- FOCAL LENGTH = 50 mm
- ⋮

IMAGING PARAMETERS OF CAPTURED IMAGE 2
- EXPOSURE TIME = 1/30s
- ⋮

⋮

302 — COMBINING TYPE INFORMATION = HDR COMBINING

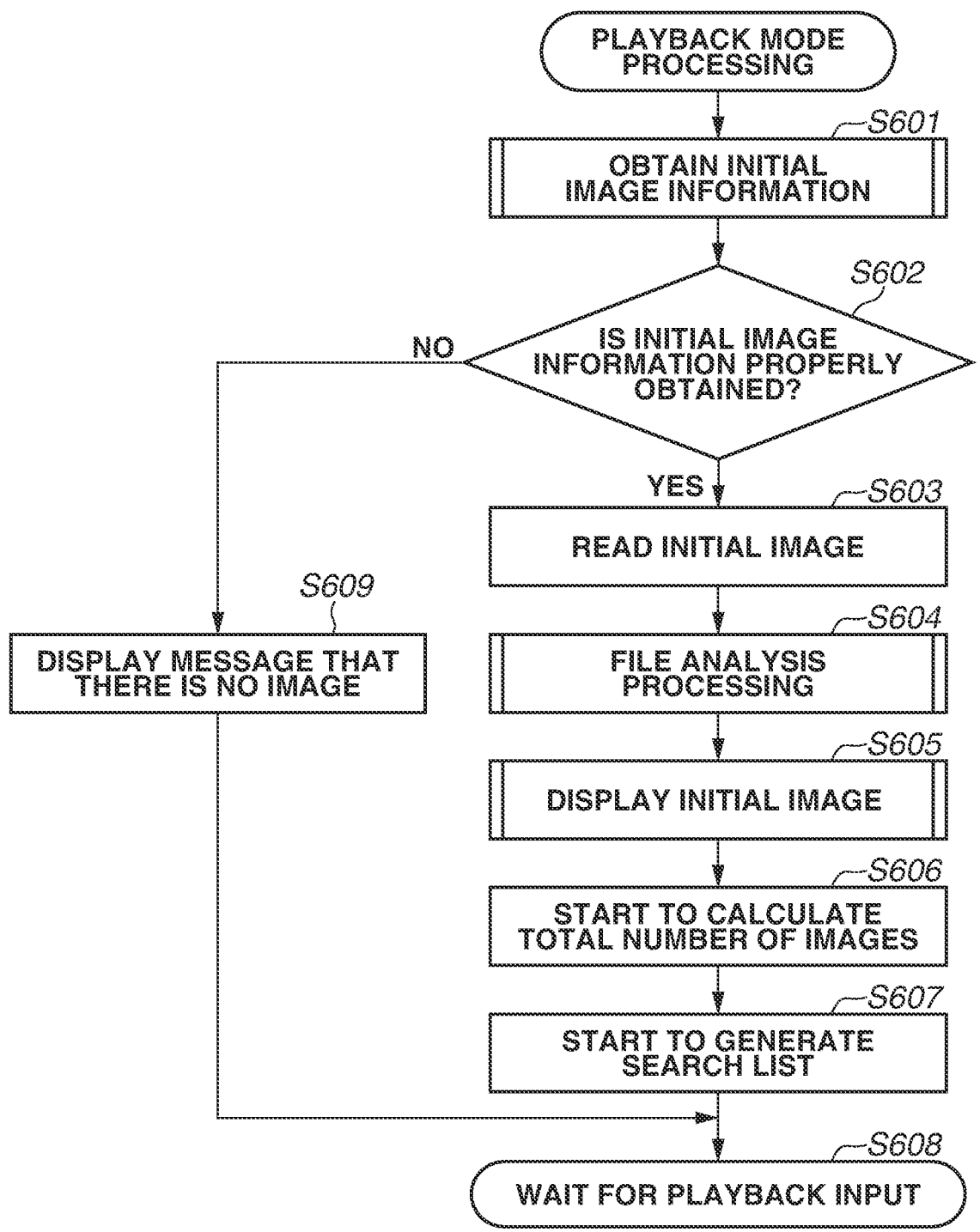

IMAGE PROCESSING APPARATUS, IMAGE PROCESSING METHOD, AND STORAGE MEDIUM

BACKGROUND OF THE INVENTION

Field of the Invention

The present invention relates to an image processing apparatus that can combine a plurality of images.

Description of the Related Art

Imaging apparatuses such as a digital camera and a camera-equipped mobile phone can attach imaging conditions to attribute information about captured image data and record the resultant as a single image file. Japanese Patent Application Laid-Open No. 2012-094978 discuses a technique for, in recording combined image data obtained by multiple exposure imaging where a plurality of images is combined during imaging, recording the number of times of multiple exposure as metadata in a file header. According to Japanese Patent Application Laid-Open No. 2012-094978, the number of times of multiple exposure is used to determine that the image data is of an image obtained by multiple exposure imaging.

SUMMARY OF THE INVENTION

However, according to the foregoing existing technique, it is only possible to identify whether an image is one captured in an imaging mode involving one type of combining that is multiple exposure imaging. No consideration has been given to images that are generated in an imaging mode involving various types of combining or by various combining processing sequences, or general-purpose supplementary information for identifying attribute information about the images. The various types of combining include combining during editing.

The present invention is directed to providing an image processing apparatus that can appropriately determine and process images based on the presence or absence of combining processing and the type of combining processing.

According to an aspect of the present invention, an image processing apparatus includes a combining unit configured to combine a plurality of images to generate a combined image, and a control unit configured to record the combined image generated by the combining unit on a recording medium, and configured to: if the combined image, generated by the combining unit, is generated by combining a plurality of captured images, and: if the combined image satisfies a predetermined condition, attach first type data to the recorded combined image, and if the combined image does not satisfy the predetermined condition, attach second type data to the recorded combined image, wherein if the combined image, generated by the combining unit, is generated by combining a plurality of captured images recorded on the recording medium, the control unit is configured to attach the second type data regardless of whether the predetermined condition is satisfied.

Further features of the present invention will become apparent from the following description of exemplary embodiments with reference to the attached drawings.

BRIEF DESCRIPTION OF THE DRAWINGS

FIG. 3 is a diagram illustrating an example of a data structure of a combining information section.

FIG. 6 is a flowchart in a playback mode according to the exemplary embodiment.

DESCRIPTION OF THE EMBODIMENTS

An exemplary embodiment of the present invention will be described in detail below with reference to the drawings. An image processing apparatus according to the exemplary embodiment of the present invention will be described by using an imaging apparatus as an example. However, examples of the image processing apparatus may include a general-purpose image processing apparatus such as a personal computer (PC), as well as a digital camera and a digital movie camera. Any apparatus capable of displaying a list of image files, such as a mobile phone, a smartphone, a tablet terminal, and a car navigation apparatus, is also applicable. An image processing apparatus according to the present exemplary embodiment covers product forms of such apparatuses.

Figure 1:
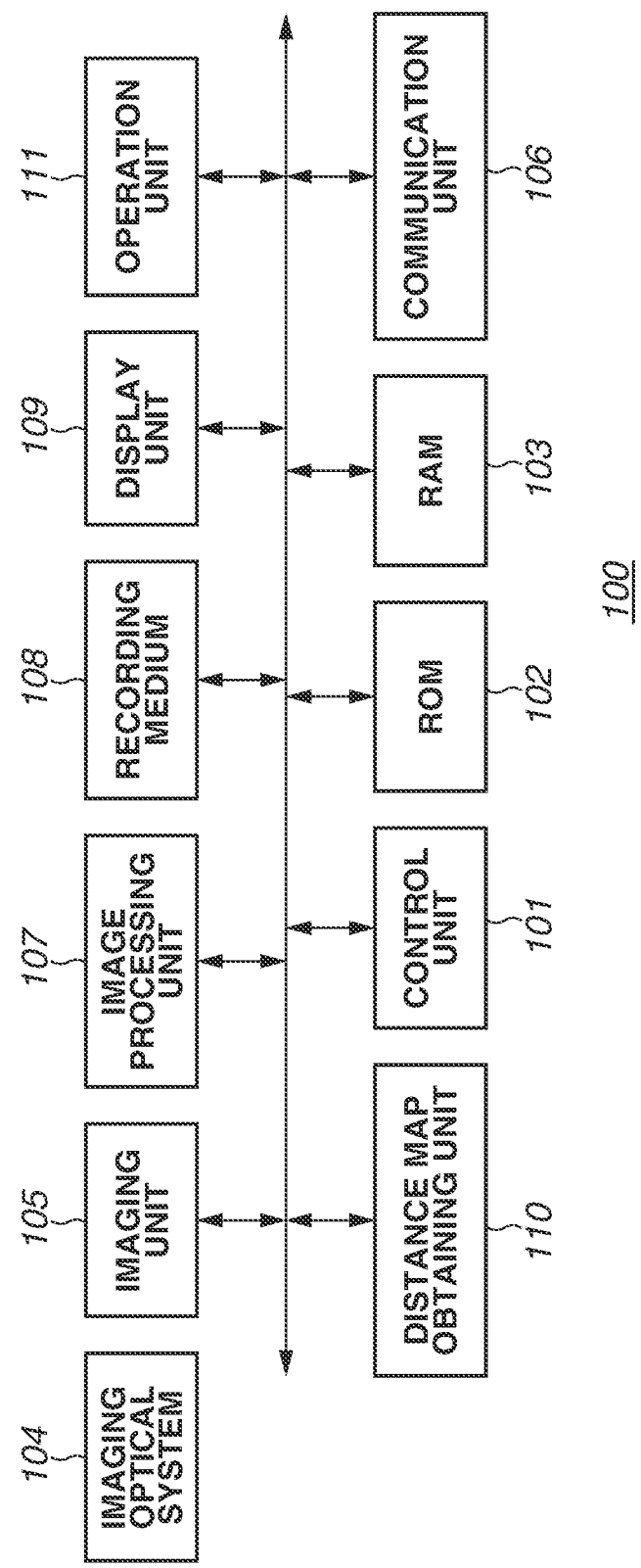
FIG. 1 is a block configuration diagram illustrating an image processing apparatus according to an exemplary embodiment.

FIG. 1 is a block diagram illustrating a functional configuration of an imaging apparatus 100 that is an example of an image processing apparatus according to the present exemplary embodiment. A control unit 101 includes a central processing unit (CPU) serving as a computer, and functions as a control unit that controls the entire imaging apparatus 100.

The control unit 101 reads a computer program for operating component units included in the imaging apparatus 100 from a read-only memory (ROM) 102 serving as a storage medium, loads the computer program into a random access memory (RAM) 103, and executes the computer program. The ROM 102 is a rewritable nonvolatile memory. The ROM 102 stores operation programs for the CPU to execute, and parameters used for operation of the component units included in the imaging apparatus 100. The RAM 103 is a rewritable volatile memory. The RAM 103 is used as a temporary storage area for data output by the operation of the component units included in the imaging apparatus 100.

An imaging optical system 104 includes a lens, a diaphragm, and a driving unit for driving such optical members, and focuses light from an object on an imaging unit 105. The imaging unit 105 includes an image sensor such as a charge-coupled device (CCD) image sensor or a complementary metal-oxide-semiconductor (CMOS) image sensor. The image sensor functions as an imaging section for photoelectrically converting an optical image formed by the imaging optical system 104 to form an analog image signal and generate a captured image. An analog-to-digital (A/D) conversion unit included in the imaging unit 105 A/D—converts the analog image signal into digital image data, which is stored in the RAM 103. While in the present exemplary embodiment the imaging section is included in the image processing apparatus, the image processing apparatus may be configured without an imaging section.

An image processing unit 107 applies various types of image processing to image data stored in the RAM 103. Examples of the image processing include white balance adjustment, color interpolation, reduction/enlargement, and filtering. A recording medium 108 is a memory card detachably attached to the imaging apparatus 100. The recording medium 108 functions as a recording unit where the image data stored in the RAM 103 is recorded. The control unit 101 here also functions as a recording control unit for recording a captured image or combined image on the recording medium 108 as a recording image. Image data processed by the image processing unit 107 and image data A/D-converted by the imaging unit 105 are recorded on the recording medium 108 as recording image data. During imaging by the imaging unit 105, the image processing unit 107 also performs combining processing on a plurality of pieces of image data that is obtained by the imaging and output from the imaging unit 105, using a method based on a previously-set imaging mode.

For example, the control unit 101 issues an instruction to the image processing unit 107 based on an imaging mode that is determined based on a signal indicating an imaging mode set by a user using an operation unit 111 or an imaging scene determined from an image by the control unit 101 during imaging. Combining processing based on the imaging mode is thereby performed. Here, the control unit 101 further determines type data indicating the type of images related to the combining by determining the imaging mode, and records the image data on the combined image resulting from the combining processing of the image processing unit 107 on the recording medium 108 in association with the determined type data. For example, in the present exemplary embodiment, the image processing unit 107 generates an image file including header information configured in compliance with a general-purpose standard (Exchangeable image file format (Exif) standard) at least in part. The type data is recorded in a data area compliant with the standard of the header information, whereby the image data recording in an image data section of the same image file is associated with the type data.

The image processing unit 107 performs combining processing on a plurality of pieces of image data input based on instructions of the control unit 101. At least part of the data to be combined may be data read from the ROM 102 or the recording medium 108. The image processing unit 107 also combines a plurality of pieces of image data recorded in the ROM 102 or on the recording medium 108 during playback based on a method of combining processing set by the user using the operation unit 111. Imaging modes, corresponding combining processing, and various types of combining processing during playback will be described below.

The display unit 109 includes a display device such as a liquid crystal display (LCD), and provides a live view display of a captured image obtained by the imaging unit 105. The display unit 109 also displays data such as text data and image data, and a graphical user interface such as a menu.

A distance map obtaining unit 110 obtains information related to a distance distribution of an object by generating a distance map, for example, by a time of flight (ToF) method or using a stereo camera. Data such as a distance map, an image shift amount distribution between parallactic images related to captured images, and a defocus amount distribution expresses a distribution of depth information in a depth direction of the object. The data expressing the distribution of depth information will hereinafter be referred to as distance map data. The obtained distance map data is stored in the RAM 103 as digital data. There are a lot of conventional methods for generating map data, and any of the methods may be used.

The operation unit 111 includes various physical operation members such as a button, a dial, a touch panel, and a slide bar. The operation unit 111 accepts the user's operations and outputs instruction signals to the control unit 101.

A communication unit 106 is a wireless local area network (LAN) interface for communicating with an external apparatus. The communication unit 106 may be any type of interface, such as a wired LAN interface and a Universal Serial Bus (USB) interface, as long as communication can be performed with the external apparatus. Image files can be transmitted and received to/from an external apparatus (such as a PC or a smartphone) via the communication unit 106.

(Data Structure of Image File)

Figure 2:
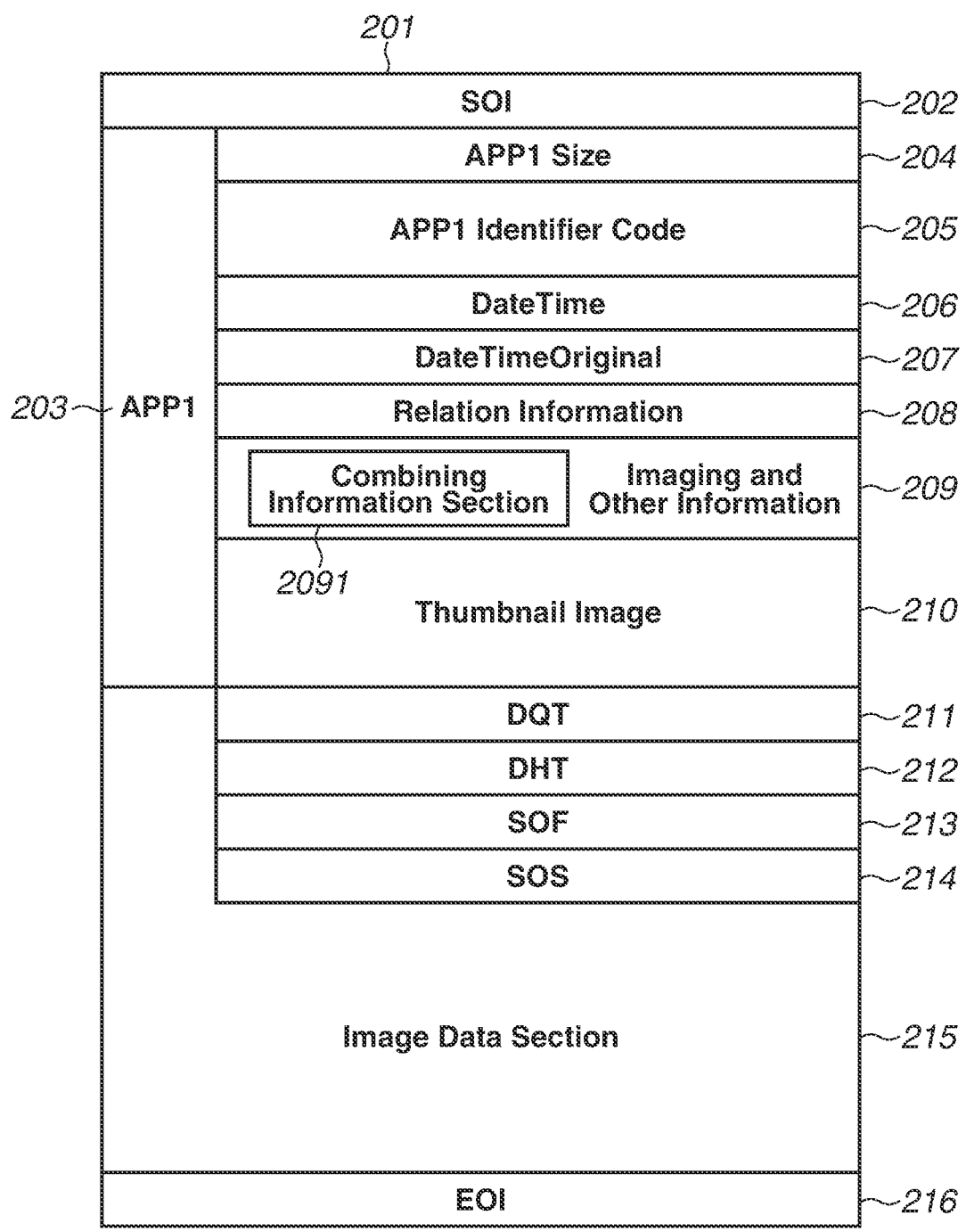
FIG. 2 is a diagram illustrating an example of a data structure of an image data

FIG. 2 illustrates a data structure of an image file generated and managed by the imaging apparatus 100. In the present exemplary embodiment, a file format compliant with the Exif standard is used. For example, an image data file (image file) 201 is generated during imaging by the imaging unit 105, obtained via the communication unit 106, or stored in the recording medium 108 or the ROM 102. When the imaging apparatus 100 processes the image data file 201, the image data file 201 can he temporarily copied to the RAM 103.

The image data file 201 includes a marker SOI 202 indicating a start of an image at the top, followed by an application marker APP1 203 (APP1 area) serving as a header area.

The application marker APP1 203 includes an APP1 size 204, an APP1 identifier code 205, DateTime 206 indicating the generation date and time of the image, DateTimeOriginal 207 indicating the generation date and time of image data, Relation Information 208 indicating a relationship between images, imaging and other information 209, and a thumbnail image 210.

DateTime 206 and the DateTimeOriginal 207 store imaging date and time information stored in the RAM 103. Relation information 208 describes predetermined information, for example, indicating that a plurality of captured images to be combined is related. The predetermined information may he an image number of the related image that is first recorded, or information indicating a specific imaging mode.

Examples of the imaging and other information 209 include an imaging date and time, imaging parameters (such as an exposure time, an aperture value, an International Organization for Standardization (ISO) speed, a focal length, and the presence or absence of an auxiliary light source), and a combining information section 2091 according to the present exemplary embodiment. The combining information section 2091 stores combining-related information generated and processed in the present exemplary embodiment.

Actual image data to be recorded includes a quantization table DQT 211, a Huffman table DHT 212, a frame start marker SOF 213, a scan start marker SOS 214, and an image data section 215 containing compressed data, and is terminated by a marker EOI 216 indicating an end of the image data.

The file structure described in the present exemplary embodiment is tailored to the structure of the Exif standard and can thus be compatible with the Exif standard. However, the recording structure of various types of information including combining information according to the present exemplary embodiment is not necessarily limited to the structure of the Exif standard. For example, various types of information may be recorded in a file other than the image data file 201, or recorded in a special database included in the imaging apparatus 100.

FIG. 3 illustrates an example of information stored in the combining information section 2091. In the present exemplary embodiment, various types of information related to actual combining are recorded for the purposes of optimization of the combining processing, restoration, and artificial intelligence (AI)-based learning based on actual combined images and information about the actual combined images. The various types of information is recorded by the image processing unit 107 in a subsequent stage, by an application on an external apparatus, or on a network server. Storing at least part of such information in a general-purpose Exif area can provide compatibility with various Exif-compliant apparatuses and enables reference even by general-purpose applications.

The combining information section 2091 includes respective areas describing image identification information 301, combining type information 302, source image number information 303 about the combined image, combined image information 304, and source image information 305 about the combined image.

The image identification information 301 is type data indicating the type of image mainly related to combining. Any one of pieces of classification information including "uncombined image", "general combined image", and "imaging time obtained combined image" is stored.

An "imaging time obtained combined image" is a classification to be applied to an image obtained by combining only a series of a plurality of source images (provisional recording images) obtained from the image sensor during imaging (not all of the series of the plurality of source images are necessarily used). This classification applies to a combined image of which specific imaging conditions (such as an aperture value, an object distance, a light source, and a lens focal length) and a range of the object (imaging field of view) each can be regarded as substantially constant when all the source images are obtained. In the case of an "imaging time obtained combined image", first type data "3" indicating an "imaging time obtained combined image" is attached as the image identification information 301.

A "general combined image" is a classification to be applied to a combined image obtained by combining a plurality of captured images (source images) without limiting the combining method. In the case of a "general combined image", second type data "2" indicating a "general combined image" is attached as the image identification information 301.

An "uncombined image" is a classification to be applied to an image that is not regarded as a combined image classified as a "general combined image" or an "imaging time obtained combined image". For example, this classification is applied to an image regarded as not combined. In the case of an "uncombined image", third type data "1" indicating an "uncombined image" is attached as the image identification information 301. Values other than the foregoing values "1" to "3" may be prepared and used as the image identification information 301. For example, type data "0" may be attached if the applicable classification is unclear.

(Combining Modes and Classifications)

Next, examples of the image identification information 301 attached to images obtained in various imaging modes involving combining processing and combined images obtained by various types of combining processing during playback will be described. In the present exemplary embodiment, as described above, the first type data "3" is generated if a plurality of images used for combining during imaging has substantially the same specific imaging conditions and angles of view (imaging fields of view). The second type data "2" is generated if the plurality of images used for combining is substantially different in either the imaging conditions or the angle of view. The third type data "1" is generated in the case of an uncombined image.

An imaging mode where a plurality of images is captured at different timings or by different imaging optical systems will hereinafter be referred to as a multi-shot imaging mode. Among examples of the modes of combining in a multi-shot imaging mode is one where high-dynamic-range (HDR) combining is performed during imaging (hereinafter, referred to as an imaging time HDR combining mode). In the imaging time UDR combining mode, the imaging conditions of the plurality of source images other than the ISO speed and shutter speed can be regarded as substantially constant. The first type data "3" is thus attached as the image identification information 301. As employed herein, imaging time HDR combining includes capturing a plurality of images at different exposures (ISO speeds and/or shutter speeds), developing the images with respective different gamma values, and combining the developed results. The imaging time HDR combining mode is a mode where appropriate images among the plurality of images with different exposure conditions are extracted and combined based on luminance values of the images.

Among the modes of combining in a multi-shot imaging mode is one where the image processing apparatus or a PC application performs HDR processing during playback (playback time HDR combining mode). In the playback time HDR combining mode, the second type data "2" is attached as the image identification information 301. The reason is that the combined image is not one combined during imaging. Another reason is that some of the imaging conditions of the plurality of source images, such as the ISO speed and the shutter speed, are not regarded as constant. An example of the HDR processing performed by the image processing apparatus or the PC application during playback includes developing user-selected images with respective gamma values based on differences in exposure and combining the developed results.

The second type data "2" is also attached to an obtained combined image as the image identification information 301 as described above, for example, in an HDR painting-style imaging mode where HDR painting-style imaging is performed as one of the modes of combining in a multi-shot imaging mode. The HDR painting-style imaging mode is a mode where a painting-like combined image is generated by performing gradation processing based on a plurality of images with different exposures (ISO speeds and/or shutter speeds).

In an imaging mode where a plurality of images is captured and a combined image is generated to implement a multi-shot noise reduction function as one of the modes of combining, the first type data "3" is attached to the obtained combined image as the image identification information 301. The reason is that the angles of view (the ranges of the object or the imaging fields of view) and the imaging conditions can be regarded as substantially constant. The multi-shot noise reduction function refers to an imaging function of aligning a plurality of images captured under the same imaging conditions based on detected amounts of camera shake and combining the images to obtain a noisereduced combined image. The multi-shot noise reduction function is used for a dark object with a lot of noise.

The first type data "3" is also attached as the image identification information 301 to a combined image obtained in a handheld nightscape imaging mode where an image of a nightscape is to be captured a plurality of times by handheld imaging without flash emission. Again, the reason is that the angles of view (the ranges of the object or the imaging fields of view) and the imaging conditions can be regarded as substantially constant.

In one of the modes of combining, images of a nightscape can be continuously captured by handheld imaging with and without flash emission. In such a case, the first type data "3" is also attached as the image identification information 301. The reason is to prevent confusion in a case where different image identification information from in the case of "handheld imaging of a nightscape without flash emission" is attached. The first type data "3" may in principle be attached as the image identification information 301 to a combined image obtained by handheld imaging of a nightscape with flash emission.

Next, creative filter imaging modes will be described. The creative filter imaging modes refer to imaging modes where captured images are given special image processing effects before recording.

If the imaging mode during imaging is a rough monochrome imaging mode, a soft focus imaging mode, a diorama-style imaging mode, a toy camera imaging mode, an oil painting-style imaging mode, a watercolor-style imaging mode, a fish eye-style imaging mode, a beautiful skin imaging mode, or a blurred background imaging mode, the third type data "1" is attached as the image identification information 301. The third type data "1" is also attached as the image identification information 301 to images obtained in edit modes (applications) where image processing equivalent to that performed in capturing images in the foregoing modes is applied to the images during playback. The reason why the third type data "1" is attached is that the combining processing performed in such imaging modes and editing modes (applications) does not use a plurality of captured images (source images), whereas the image processing in some of the modes involves combining of images.

The rough monochrome imaging mode is an imaging mode where an image is captured, random noise is superposed on the captured image, and monochrome processing is applied thereto to provide an effect like a monochrome film. The soft focus imaging mode is an imaging mode where, for example, an image is captured, a low pass filter (LPF) is applied to the captured image, and the resulting image and the original captured image are combined at a constant ratio. The diorama-style imaging mode is an imaging mode where, for example, an image is captured, an LPF is applied to the captured image, and the resulting image and the original captured images are combined in part. The captured image is thereby blurred in part to generate an image that is subjected to an image effect as if actual objects are turned into a diorama and an image of the diorama is captured.

The toy camera imaging mode is an imaging mode where, for example, an image is captured and an image effect as if the image is captured with a toy camera is applied thereto. Examples of image processing performed in the toy camera imaging mode include combining an image to which an LPF is applied, with the original image to reproduce a soft focus effect, and performing luminance conversion and color conversion to reproduce effects such as brighter finishing, unnatural color tone, and vignetting. The oil painting-style imaging mode is an imaging mode where, for example, an image is captured, image processing is applied to the captured image, and the resulting image and the original image are combined to produce an effect that the combined image looks like an oil painting.

The watercolor-style imaging mode is an imaging mode where, for example, an image is captured, image processing is applied to the captured image, and the resulting image and the original image are combined to produce an effect that the combined image looks like a watercolor painting. The fish eye-style imaging mode is an imaging mode where, for example, an image is captured, and pixels are combined (interpolated) area by area to cause a fish eye lens-like distortion, whereby an effect as if the image is captured with a fish eye lens is produced. The beautiful skin imaging mode is an imaging mode where high noise reduction (NR) is applied to skin color portions to lower resolution so that the skin appears to have smoother texture. The blurred background imaging mode is an imaging mode where, for example, two images are captured with different aperture values, a main object and the background are separated based on differences between the two images, and the background is blurred. In such a case, the number of source images to be combined is one, whereas a plurality of images is captured to determine the areas to be blurred. The blurred background imaging mode can be implemented by opening the aperture.

A date superimposition imaging mode is an imaging mode where date text data is superimposed on the image.

Among the modes of combining is a multiple exposure imaging mode (multiple combining mode). In the multiple exposure imaging mode, the second type data "2" is attached as the image identification information 301. The reason is that both the imaging conditions and the angles of view can be freely set by the user and are thus not regarded as constant. If, however, the control unit 101 determines that the imaging conditions and the angles of view in capturing a plurality of images can be regarded as constant, the first type data "3" is attached as the image identification information 301, The reason is that the imaging conditions can sometimes be determined to remain unchanged by detecting the use of a tripod. In an exemplary embodiment where the multiple exposure imaging mode (multiple combining mode) is implemented with continuous shooting, the first type data "3" can always be attached as the image identification information 301 since the angles of view and the imaging conditions can be regarded as substantially constant. Examples of the multiple exposure imaging mode include an addition mode, an addition average mode, a comparative light mode, and a comparative dark mode. The addition mode is a multiple exposure imaging mode where a plurality of images is captured and the raw images are simply added. The addition average mode is a multiple exposure imaging mode where a plurality of images is captured and the raw images are simply added and averaged. The addition average mode is intended to improve a signal-to-noise (S/N) ratio of an extremely dark image, for example. The comparative light mode is a multiple exposure imaging mode where a plurality of images is captured, and the raw images are combined by performing comparative light combining processing for using a pixel value that is not the lower of pixel values at the same coordinates.

The comparative dark mode is a multiple exposure imaging mode where a plurality of images is captured, and the raw images are combined by performing comparative dark combining processing for using a pixel value that is not the higher of pixel values at the same coordinates.

Among the modes of combining are a panoramic imaging mode, a depth combining imaging mode, and a starry sky portrait imaging mode. In such modes, the second type data "2" is attached as the image identification information 301. The reason is that source images having different angles of view are combined. The panoramic imaging mode is a mode where images are captured at a plurality of angles of view by the user panning the imaging apparatus 100, and the captured images are combined. The plurality of images captured at a plurality of different angles of view are thereby combined and connected to generate an image of wider angle. Wide angle combined images obtained in the panoramic imaging mode can include omnidirectional (360°) images.

In the depth combining imaging mode and the starry sky portrait imaging mode, the first type data "3" is attached as the image identification information 301. The reason is that, in the case of the depth combining imaging mode, what is changed is only the focus, and the angles of view can be regarded as substantially constant and the imaging conditions other than the focus can also be regarded as substantially constant. The same applies to the case of the starry sky portrait imaging mode, where the angles of view can be regarded as substantially constant and the imaging conditions other than the focus can also be regarded as substantially constant.

The depth combining imaging mode is an imaging mode where a plurality of images is captured with different focuses, and in-focus areas of the plurality of images are combined based on a distance map obtained by the distance map obtaining unit 110 to generate an image having a depth greater than those of the captured images. The starry sky portrait imaging mode is an imaging mode for successively capturing a plurality of images, for example, two images without flash emission after flash imaging of capturing an image with flash emission, and combining the three images.

Among the modes of combining is a starry sky trajectory imaging mode. In the starry sky trajectory imaging mode, the first type data "3" is attached as the image identification information 301. The reason is that the angles of view (the ranges of the object or the imaging fields of view) and the imaging conditions can be regarded as constant. The starry sky trajectory imaging mode refers to an imaging mode where a plurality of images of the starry sky is captured and combined by comparative light combining.

Now, suppose that the imaging unit 105 is a stacked sensor, for example, one having a multilayer structure where an image sensor and a signal processing unit are integrated. Even if the stacked sensor internally combines images, the output from the stacked sensor can be a single piece of image data having substantially the same data format as an ordinary uncombined image. In such a case, the third type data "1" is thus attached as the image identification information 301.

On the other hand, if the stacked sensor internally combines a plurality of images captured with the same imaging conditions by using a memory in the stacked sensor, the first type data "3" is attached as the image identification information 301.

Among the modes of combining is one called a super-resolution imaging mode, where a plurality of captured images is combined with slight shifts in position to obtain increased resolution. In such a case, the first type data "3" is attached as the image identification information 301. The reason is that in the case of the super-resolution imaging mode, both the angles of view and the imaging conditions other than the focus can be regarded as substantially constant.

The combining type information 302 is information indicating what types of combining processing mode, combining processing, and combining conditions the composite image is combined by. The combining type information 302 stores at least one of pieces of information corresponding to actual image data based on type data corresponding to the plurality of combining modes, such as the multiple exposure mode, the addition mode, the comparative light mode, the UDR combining mode, and the panoramic combining mode as described above.

The source image number information 303 is information about the number of images obtained to generate the image data of the image data file 201. The source image number information 303 includes information about the number of captured images (source images), the number of images combined that indicates the number of source images used for the combined image, and used image numbers. The number of captured images indicates the total number of images captured to generate actual image data. The number of captured images includes the number of images that are not used for the final combined image, for example, because of low image quality due to camera shake. The number of images that have been combined indicates the number of images that are actually used to generate the image data and are stored in the image data section 215 of the image data file 201. The used image numbers are information including a series of image numbers related to the respective images that are combined in generating actual image data and counted in the number of images that have been combined.

The combined image information 304 records information about statistics related to the imaging conditions of the images used for the combining. In FIG. 3, the maximum value of the exposure time among those of the images used for the combining is recorded as the statistic of the exposure time. An average of the aperture values, an average of the ISO speeds, and an average of the focal lengths of the plurality of images used for the combining are recorded as the statistics of the aperture value, the ISO speed, and the focal length, respectively.

The statistics related to the imaging conditions to be recorded in the combined image information 304 are not limited to one type each. A plurality of types of statistics, such as a maximum value, a minimum value, a total value, an average, and a variance, may he recorded depending on the purposes of data collection and applications. In the present exemplary embodiment, the combined image information 304 stores only the statistics of the imaging parameters about the images used for the combining. However, this is not restrictive, and the combined image information 304 may store one type of or a plurality of types of information about the statistics including those of images that are captured to generate the image data and not used for the combining.

The source image information 305 is information about the imaging parameters of the images captured to generate the image data of the image data file 201. The imaging parameters, such as an exposure time, an aperture value, an ISO speed, and a focal length, of each of the captured images are recorded in order. With such information stored, information about how many images captured with what imaging parameters are obtained to generate a combined image of a scene can be collected.

(Overall Operation of Imaging Apparatus)

An overall operation of the imaging apparatus 100 according to the present exemplary embodiment will be described below with reference to the flowchart of FIG. 4 for describing the overall operation of the imaging apparatus

100 according to the present exemplary embodiment. The following flowcharts including that of FIG. 4 are implemented by the control unit 101 reading a program stored in the ROM 102 and performing arithmetic processing and control.

(Overall Procedure)

In step S401, the user operates a power switch included in the operation unit 111 to power on the imaging apparatus 100, and the control unit 101 initializes flags and control variables. The control unit 101 also obtains imaging mode information, and makes determinations and settings. If an image mode involving combining processing is set, the control unit 101 also obtains setting information about the number N of images to be used for combining, and makes determinations and settings. In step S402, the control unit 101 determines a set position of a mode change switch included in the operation unit 111. If the mode change switch is set to an imaging mode (YES in step S402), the processing proceeds to step S403. If the mode change switch is set to other than an imaging mode (NO in step S402), the processing proceeds to step S404. Details of imaging mode processing in step S403 will be described below.

In step S404, the control unit 101 determines whether the mode change switch is set to a playback mode. If the mode change switch is set to the playback mode (YES in step S404), the processing proceeds to step S405. If the mode change switch is set to other than the playback mode (NO in step S404), the processing proceeds to step S406. Details of playback mode processing in step S405 will be described below. In step S406, the control unit 101 executes processing corresponding to the selected other mode. After the execution, the processing proceeds to step S407. Examples of the other mode include a communication mode where files stored in the recording medium 108 are transmitted and received.

In step S407, the control unit 101 determines the set position of the power switch. If the power switch is set to power-on (NO in step S407), the processing returns to step S402. If the power switch is set to power-off (YES in step S407), the processing proceeds to step S408. In step S408, the control unit 101 performs predetermined end processing. The end processing includes the following processing: the control unit 101 changes display of the display unit 109 to an end state, and closes a lens barrier to protect the imaging unit 105. The control unit 101 also records parameters and setting values, including the flags and control variables, and the setting mode into a nonvolatile memory, and then shuts down power to portions where power supply is not needed.

(Imaging and Recording Processing)

Figure 5:
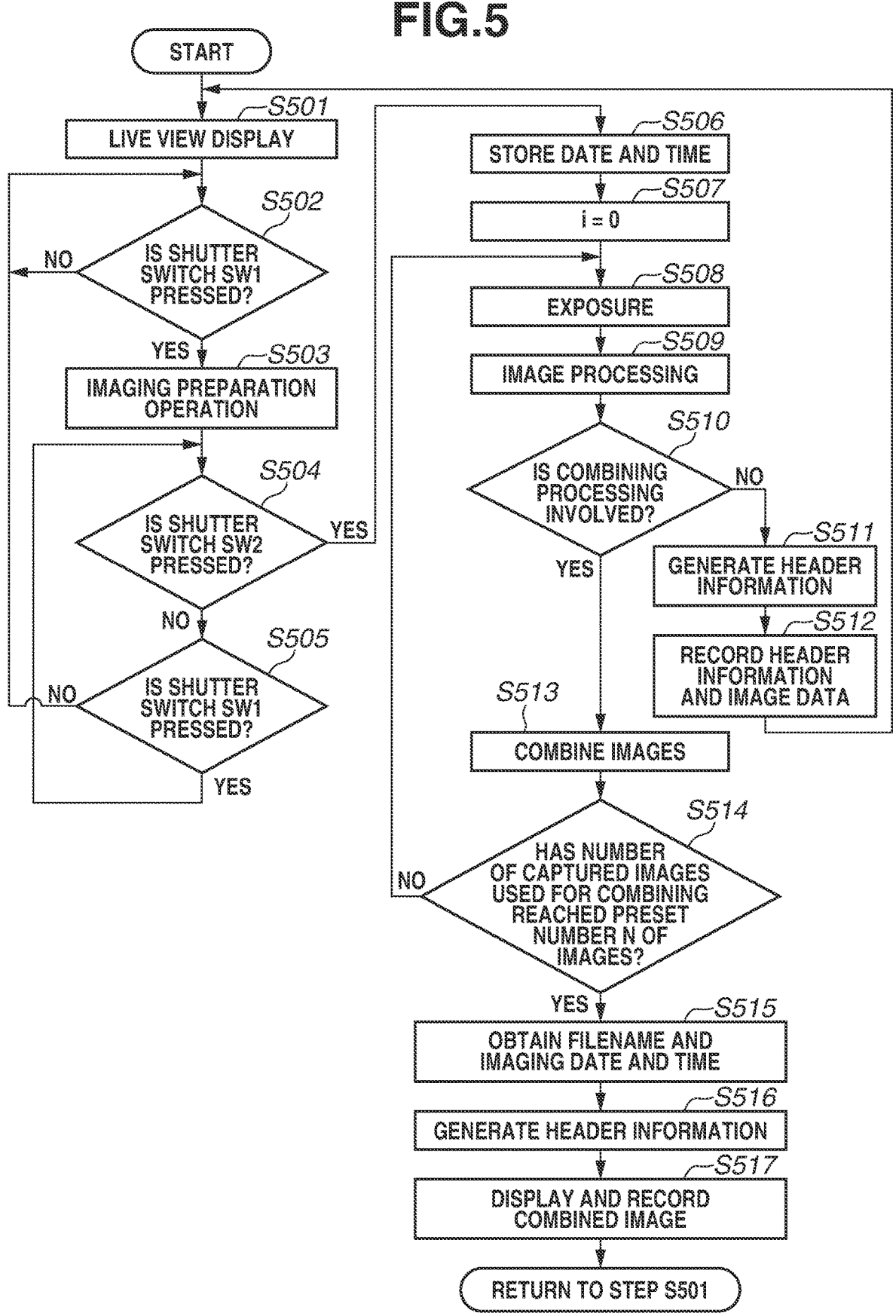
FIG. 5 is a flowchart in an imaging mode according to the exemplary embodiment.

FIG. 5 illustrates a flowchart of imaging and recording processing of the imaging apparatus 100 according to the present exemplary embodiment.

(Imaging Mode Processing)

Figure 4:
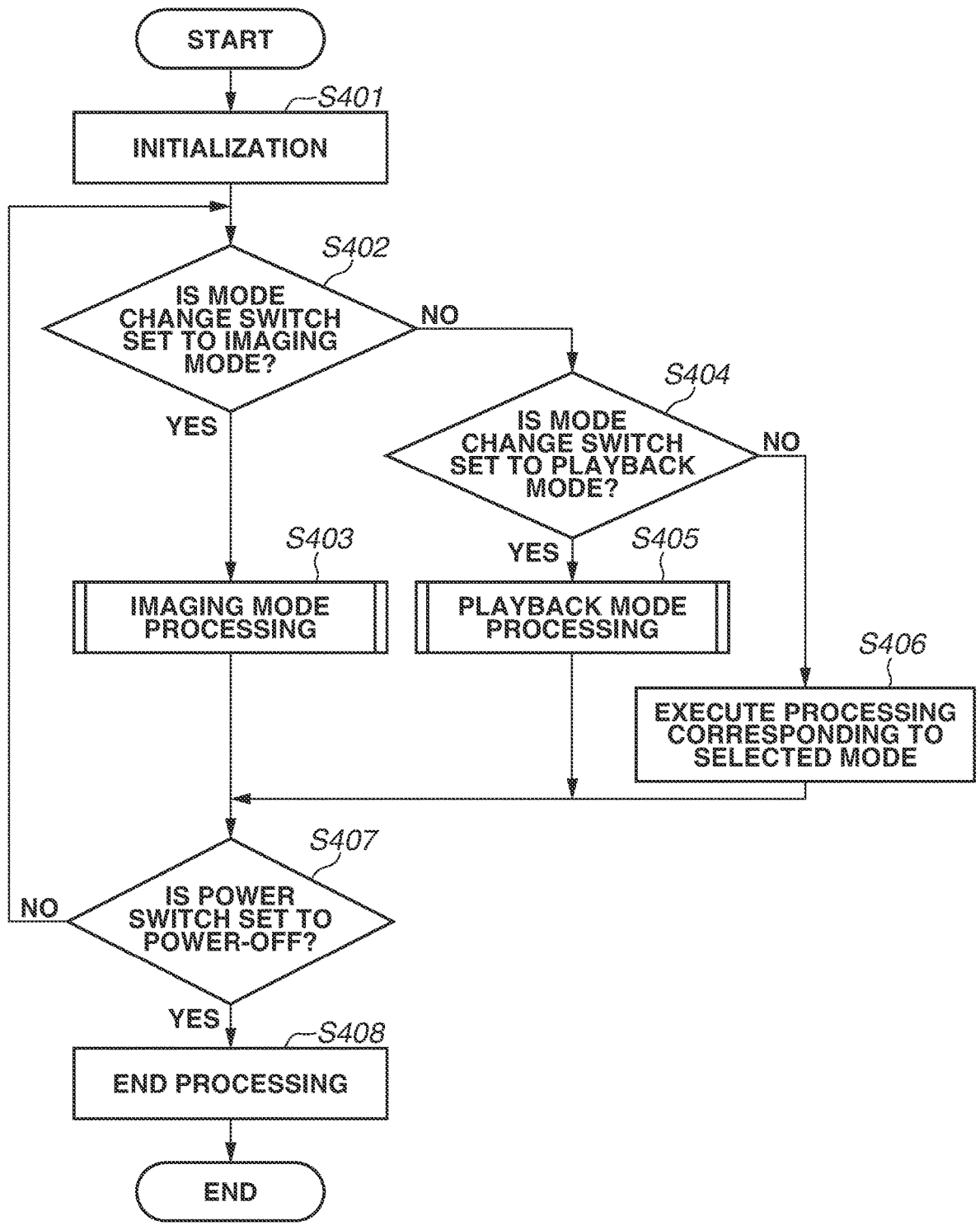
FIG. 4 is an overall flowchart of the image processing apparatus according to the exemplary embodiment.

FIG. 5 is a flowchart illustrating details of the imaging mode processing in step S403 of FIG. 4.

If an imaging mode is started, then in step S501, the control unit 101 provides a live view display by successively outputting captured images to the display unit 109 to successively display the captured images on the display unit 109.

In step S502, the control unit 101 determines whether a shutter switch SW1 (not illustrated) is pressed by the user. If the shutter switch SW1 is pressed (YES in step S502), the processing proceeds to step S503. If the shutter switch SW1 is not pressed (NO in step S502), the processing returns to step S502, i.e., the control unit 101 waits until the shutter switch SW1 is pressed. In step S503, the control unit 101 performs an imaging preparation operation. Specifically, the control unit 101 measures distance and adjusts the focus of an imaging lens to an object. The control unit 101 also measures light and determines the aperture value and shutter time. Based on the light measurement result, the control unit 101 also sets the amount of flash emission as appropriate.

In step S504, the control unit 101 determines whether a shutter switch SW2 (not illustrated) is pressed by the user. If the shutter switch SW2 is pressed (YES in step S504), the processing proceeds to step S506. If the shutter switch SW2 is not pressed (NO in step S504), the processing proceeds to step S505. In step S505, the control unit 101 determines whether the shutter switch SW1 continues to be pressed. If the pressing of the shutter switch SW1 is released (NO in step S505), the processing returns to step S502. If the shutter switch SW1 continues to be pressed (YES in step S505), the processing returns to step S504.

In step S506, the control unit 101 obtains the date and time to start capturing an image from a real time clock (RTC) in the control unit 101, and stores the date and time into the RAM 103. In step S507, the control unit 101 sets a combining processing flag i to 0.

In step S508, the control unit 101 opens a shutter in the optical system 104 having an aperture function based on light measurement data stored in the RAM 103 or the ROM 102 and the aperture value, whereby the image sensor of the imaging unit 105 starts to be exposed.

In step S509, the control unit 101 outputs image data from the imaging unit 105, and performs image processing such as compression and encoding processing by using the image processing unit 107. In step S510, the control unit 101 determines whether the set imaging mode is one involving combining processing. In other words, in step S510, the control unit 101 functions as a determination unit that determines the combining method to be performed in the imaging mode or by a combining unit to be described below.

If the imaging mode is not one involving combining processing (NO in step S510), the processing proceeds to step S511. In step S511, the control unit 101 determines to attach the third type data "1" indicating a normal image (uncombined image) as the image identification information 301 recorded in the header area, and stores the image identification information 301 (generates header information).

Here, the control unit 101 functions as a type data generation unit that generates type data corresponding to, for example, the type of combining associated with the settings of the imaging mode. As described above, if the image processing unit 107 does not combine images, the control unit 101 determines to attach the third type data ("1" as the image identification information 301). In step S512, the control unit 101 records the header information and the image data on the recording medium 108. Here, the control unit 101 functions as a recording control unit that records the type data corresponding to the type of combining into APP1 203, which is the header area according to the Exif standard, in association with the recording image. After step S512, the processing returns to step S501.

In step S510, if the set imaging mode is determined to be one involving combining processing (YES in step S510), the processing proceeds to step S513. In step S513, the control unit 101 combines images in the imaging mode set in advance. Here, the control unit 101 functions as a combining unit for combining a plurality of captured images by a plurality of types of methods to generate a combined image. In step S514, the control unit 101 determines whether the number of captured images used for the combining has reached a preset number N of images. If the number of captured images has not reached N (NO in step S514), the processing returns to step S508. In step S508, the control unit 101 performs a new exposure operation. If the number of captured images has reached N (YES in step S514), the processing proceeds to step S515. In step S515, the control unit 101 obtains a filename and the imaging date and time. In step S516, the control unit 101 generates header information for recording such data and the type data corresponding to the type of combining in APP1 203 that is the header area.

In step S516, the control unit 101 determines the type data to be recorded in association with the image data based on the set imaging mode. As described above, if images are combined by the combining unit, the control unit 101 generates one of at least two types of type data ("2" or "3" as the image identification information 301) based on the type of combining. The control unit 101 also determines an appropriate classification from among at least three types of type data, including those for cases where images are combined and where images are not combined by the image processing unit 107. In step S517, the control unit 101 displays the combined image on the display unit 109 and records the combined image on the recording medium 108. Here, the control unit 101 functions as a recording unit that records the type data in APP1 203, which is the header area according to the Exif standard, in association with the recording image.

Here, if the type data is predetermined type data (the image identification information 301 is "3"), the control unit 101 records at least the number of captured images used for combining and the imaging conditions of the captured images used for combining, such as the exposure times, into the same area APP1 203, After step S517, the processing returns to step S501.

In the exemplary embodiment described above, images are combined each time an exposure is ended. It will be understood, however, that the combining processing may be performed after N images are captured.

(Playback Mode Processing)

FIG. 6 is a flowchart illustrating details of the playback mode processing in step S405 of FIG. 4. The playback mode is started by a playback instruction given by the user via the mode change switch. Alternatively, the processing of this flowchart is started if the imaging apparatus 100 is powered on and activated in a state where the playback mode is set.

In step S601, the control unit 101 initially obtains initial image information from the recording medium 108. An initial image refers to a latest image or an image displayed by the previous playback. Obtaining the initial image information before calculation of a total number of images and generation of a search list to be described below enables an image display of the initial image immediately after the imaging apparatus 100 enters the playback mode. This can avoid an issue of no display during processing such as the calculation of the total number of images.

In step S602, the control unit 101 determines whether the initial image information is properly obtained in step S601. The reason for making such a determination is that there can be cases with no images or where the initial image information fails to be obtained due to a medium defect. If the initial image information is successfully obtained, at least one image is determined to exist. If there is an image (YES in step S602), the processing proceeds to step S603. If there is no image (NO in step S602), the processing proceeds to step S609.

In step S603, the control unit 101 reads the initial image from the recording medium 108 based on the initial image information obtained in step S601. In step S604, the control unit 101 performs file analysis processing to analyze and obtain imaging information about the read initial image and attribute information such as combining information.

Here, the control unit 101 functions as a type data obtaining unit that obtains type data corresponding to the type of combining, information indicating a combing type, the number of captured images used for combining, and the imaging conditions of the captured images used for the combining, which are recorded in association with the recording image. The control unit 101 also checks whether the image data is broken.

In step S605, the control unit 101 displays the read initial image, and selectively displays attribute information, such as the imaging information and the combining information, along with the initial image as appropriate. Such a selective display will be described below with reference to FIGS. 7A, 7B, and 7C. If the result of the file analysis processing in step S604 shows that the image data is improper data, like the file of the initial image is broken in part, the control unit 101 provides an error display as well.

In step S606, the control unit 101 starts to calculate the total number of images recorded on the recording medium 108 to obtain the total number of images. This processing can be run asynchronously with image display processing, and the next image can be displayed without waiting for the completion of the processing. Such processing enables browsing of images even if a lot of images are recorded on the recording medium 108 and it takes a long time to calculate the total number of images.

In step S607, the control unit 101 analyzes all the images in the recording medium 108 and starts to generate a search list as a result of the search. A search list is a list where attribute information attached to the images is obtained in advance and managed in a centralized manner. The generation of the search list enables, for example, collective handling of images having a certain attribute as targets to be played back or as targets to be deleted. Like the calculation of the total number of images, the processing for generating the search list can be run asynchronously with the image display processing, and the next image can be displayed. In step S608, the control unit 101 enters a state of waiting for a playback input from the user.

If there is no image in step S602, then in step S609, the control unit 101 provides a display that there is no image, including a message display that "there is no image", via the display unit 109, The processing proceeds to step S608.

(Screen Display)

Figure 7A:
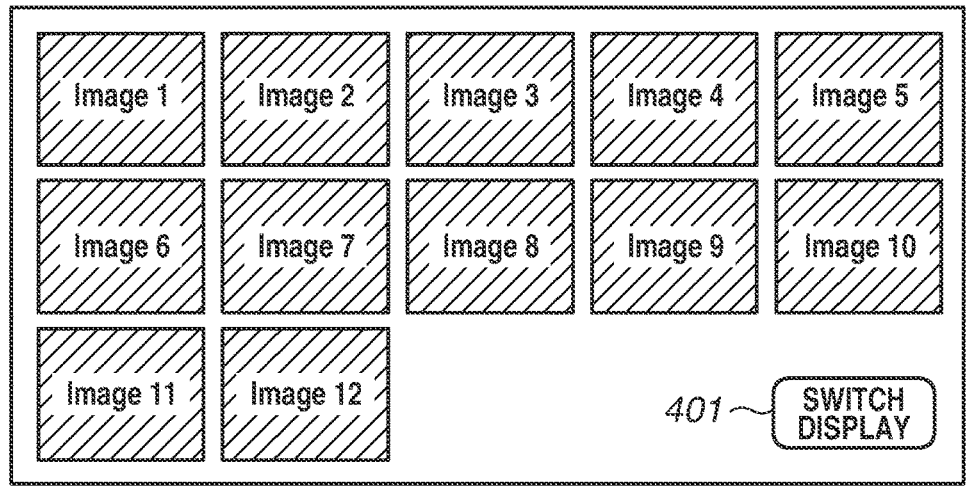
FIGS. 7A, 7B, and 7C are diagrams illustrating display examples of an image list according to the exemplary embodiment.

Next, a method for displaying image data according to the present exemplary embodiment will be described. FIG. 7A illustrates an example of a screen displayed on the display unit 109 when an image display application is run on the imaging apparatus 100.

FIG. 7A illustrates a state where image data Image 1 to Image 12 stored in the RAM 103 is listed. The image data Image 1 to Image 12 is image data obtained from a digital camera or a mobile phone, for example. The image data Image 1 to Image 12 may be downloaded from a server on a network. Thumbnails of the image data Image 1 to Image 12 may be used instead of the image data itself. If the user selects (clicks) a display switch button 401 in the state of FIG. 7A, the screen transitions to that of FIG. 7B.

Figure 7B:
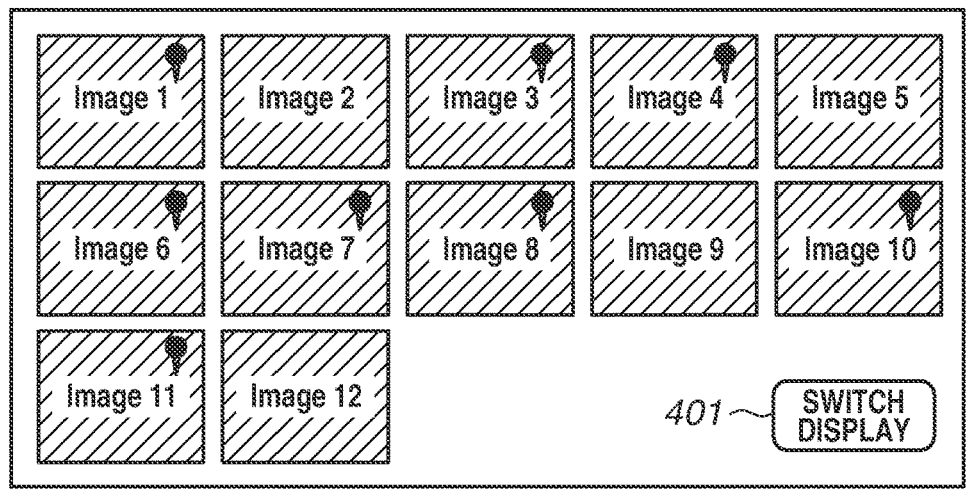

As illustrated in FIG. 7B, a pin-shaped icon (hereinafter, a pin icon) is superimposed on the thumbnail of each piece of image data to which combining-related information is attached. In other words, pin icons are displayed for image files having combining-related information. This screen example shows that the pieces of image data Image 1, Image 3, Image 4, Image 6, Image 7, Image 8, Image 10, and Image 11 include a description of the image identification information 301 (such as "1", "2", and "3") and the combining type information 302 as the combining-related information.

It will be understood that the pin icons do not necessarily need to be entirely superimposed on the thumbnails. The pin icons may he superimposed in part, or not superimposed but displayed near the thumbnails, as long as image files with and without combining-related information can be distinguished. On the screen illustrated in FIG. 7B, the pin icons are superimposed on the pieces of image data where the combining-related information is described. By observing this screen, the user can easily check which piece of image data the combining-related information is attached to.

Figure 7C:
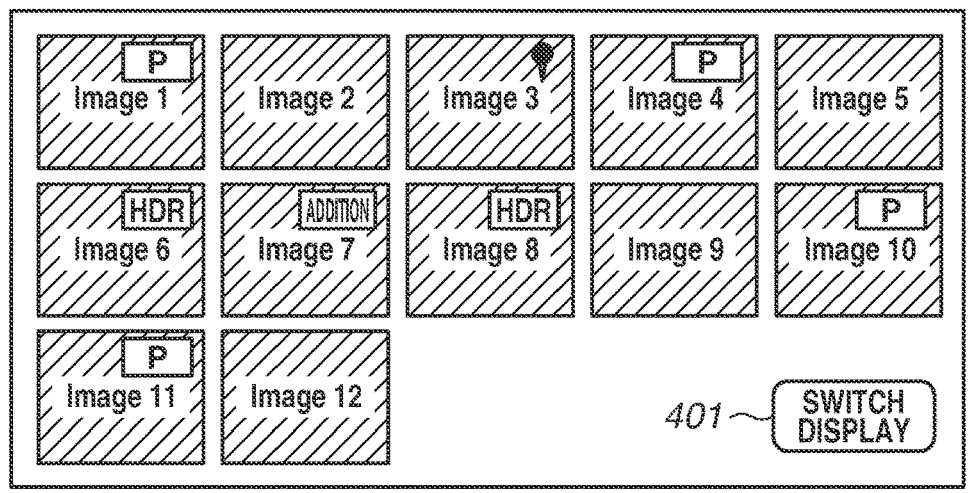

If the user further clicks the display switch button 401 in the state of FIG. 7B, the screen transitions to that of FIG. 7C. As illustrated in FIG. 7C, some of the pin icons are replaced with icons or characters corresponding to the image identification information 301 and/or the combining type information 302. This can facilitate identification of the image identification information 301 and/or the combining type information 302.

For example, "P"s representing panoramic combining or icons representing the panoramic combining are superimposed on the pieces of image data Image 1, Image 4, Image 10, and Image 11. This is intended to indicate that the combining type information 302 is "panoramic combining", i.e., the pieces of image data Image 1, image 4, Image 10, and Image 11 are combined image data obtained by using the panoramic combining.

"HDR" representing HDR combining or icons representing the HDR combining are superimposed on the pieces of image data Image 6 and Image 8. This is intended to indicate that the combining type information 302 is "HDR combining", i.e., the pieces of image data Image 6 and Image 8 are combined image data obtained by the HDR combining.

"ADDITION" representing addition combining or an icon representing the addition combining is superimposed on the image data Image 7. This indicates that the combining type information 302 is "addition combining", i.e., the image data Image 7 is combined image data obtained by the addition combining. The pin icon on the image data Image 3 remains unchanged. This indicates that the image data Image 3 does not include a description of the combining type information 302. If the number of captured images used for combining and the imaging conditions of the captured images used for combining are recorded on the recording medium 108 in association with a recording image, at least either the number of captured images or the imaging conditions may be selectively displayed. In particular, if the type data is "3", the number of captured images used for combining and the imaging conditions of the captured images used for combining are recorded on the recording medium 108 in association with the recording image.

As described above, on the screen of FIG. 7C, characters or icons corresponding to the combining type information 302 are superimposed on the image data. This enables the user to easily check which piece of image data is combined by which combining type, the number of captured images, and the imaging conditions of the captured images used for combining. If the user clicks the display switch button on the screen of FIG. 7C, the screen transitions to that of FIG. 7A.

In other words, the foregoing three types of screens are switched in order each time the display switch button 401 is clicked.

In the exemplary embodiment described above, the display mode loops in order of FIG. 7A, FIG. 7B, FIG. 7C, FIG. 7A, . . . each time the display switch button 401 is operated. However, one of the display modes may be directly specified from a display menu, and the image data may be displayed accordingly.

At least one of the following may also be displayed: the image identification information 301, the combining type information 302, the source image number information 303 indicating the number of captured images used for combining, the combined image information 304, and the source image information 305 about a combined image, indicating the imaging conditions of the captured images. The user can figure out the intentions and contrivances of the photographer by observing such a display.

(Image Processing During Playback)

Now, an operation when the image processing unit 107 performs image processing during image playback will be described. For example, suppose that the control unit 101 reads image data from the ROM 102 or the recording medium 108 and displays the image data on the display device of the display unit 109. Based on an instruction for image processing given by the user via the operation unit 111 in such a state, the control unit 101 inputs image data corresponding to the image displayed on the display unit 109 to the image processing unit 107 and causes the image processing unit 107 to perform the image processing. The control unit 101 here rewrites the header information about the target image data of the image processing based on the image processing performed by the image processing unit 107. Specifically, consider a case where the image processing unit 107 executes image processing to be performed based on the pixel values of image data to be processed, such as gradation conversion processing, color conversion processing, defect correction processing, and filter processing, on the image data of an image file where the first type data "3" is stored as the image identification information 301.

In such a case, the control unit 101 also stores the first type data "3" indicating an imaging time obtained combined image as the image identification information 301 in the image file where the processed image data is stored. Now, consider a case where image processing involving some kind of combining processing with other source images or combining processing with text data, a frame, an icon, or computer graphics (CG) is performed on the image data of an image file where the first type data "3" is stored as the image identification information 301. In such a case, the control unit 101 stores the second type data "2" indicating a general combined image as the image identification information 301 in the image file where the processed image data is stored. Such operation of the control unit 101 can ensure the reliability of information about imaging time obtained combined images indicated by the first type data "3" within the imaging apparatus 100. By contrast, if any of the foregoing types of image processing is performed on the image data of an image file where the second type data "2" is stored as the image identification information 301, the control unit 101 stores the second type data "2" indicating a general combined image as the image identification information 301 in the image file where the processed image data is stored.

Now, consider a case where image processing that generates an image classified as a general combined image ("2") or an uncombined image ("1") is performed on the image data of an image file where the third type data "1" is stored as the image identification information 301. In such a case, the control unit 101 determines the image identification information 301 corresponding to the processed image data based on the classification. Specifically, the control unit 101 determines whether the image processing performed on the playback image is combining processing, and determines the method of the combining processing. Based on the determinations, the control unit 101 then determines the image identification information 301 to be recorded in the image file where the processed image data is stored, and records the image identification information 301 in the combining information section 2091 of the image file containing the processed image data. If other image processing that is performed based on the pixel values of the image data to be processed, such as the gradation conversion processing, the color conversion processing, the defect correction processing, and the filter processing, is executed, the control unit 101 stores the third type data "1" indicating an uncombined image as the image identification information 301 in the image file where the processed image data is stored.

As described above, according to the present exemplary embodiment, the recording of information such as information stored in the combining information section 2091 along with image data enables the user or a computer to appropriately determine and process the image based on the presence or absence of combining processing and the type of combining processing. For example, image files including HDR-combined images can be collected and information recorded in the combining information sections 2091 of the image files can be analyzed by an AI to learn various imaging conditions. The learning results then can be used as reference information for learning differences in exposure based on scenes and compositions. Exposure times and ISO speeds of material images can also be used for that purpose.

In the case of starry sky trajectory imaging, how much time of imaging produces what level of trajectories can be estimated from a tag indicating a total exposure period, attached to the combined image. The total exposure period includes the exposure times of the captured images and non-exposure periods between the imaging operations of the captured images. Such an estimation saves the user setting a uselessly long imaging time.

For camera training uses, information about combining failures (such as when the imaging apparatus 100 determines that combining is failed during imaging, when a cloud server determines that combining is failed, and when the user determines that combining is failed, and gives a low rating) is recorded in a file. Such information can be used to determine imaging conditions for the next time.

For example, if the causes of the failures are considered to be camera shake, the control unit 101 regards the user as prone to camera shake and can make improvements such as automatically setting a shorter exposure time for the subsequent imaging.

Information such as information stored in the combining information section 2091 can also be used to determine image processing parameters of a combined image.

When an application applies image processing on a combined Joint Photographic Experts Group (JPEG) image, the information in the combining information section 2091 is referred to.

An application that stores an NR parameter for each ISO speed and applies an NR parameter based on the ISO speed used in capturing an image can modify the logic for parameter determination in the case of a combined image.

For example, the application can switch the NR parameters based on the number of images that are combined and the ISO speeds of the source images. For example, an NR parameter for ISO 3200 is used for an ISO 3200 uncombined image, an NR parameter for ISO 2500 is used for a combined image of two ISO 3200 images, and an NR parameter for ISO 1600 is used for a combined image of four ISO 3200 images.

Embedding the foregoing combining information section 2091 in APP1 of the Exif structure, or the imaging condition data in particular, can ensure high compatibility with existing Exif-compliant apparatuses and software.

(Editing Processing of Recording Image During Playback)

Figure 8:
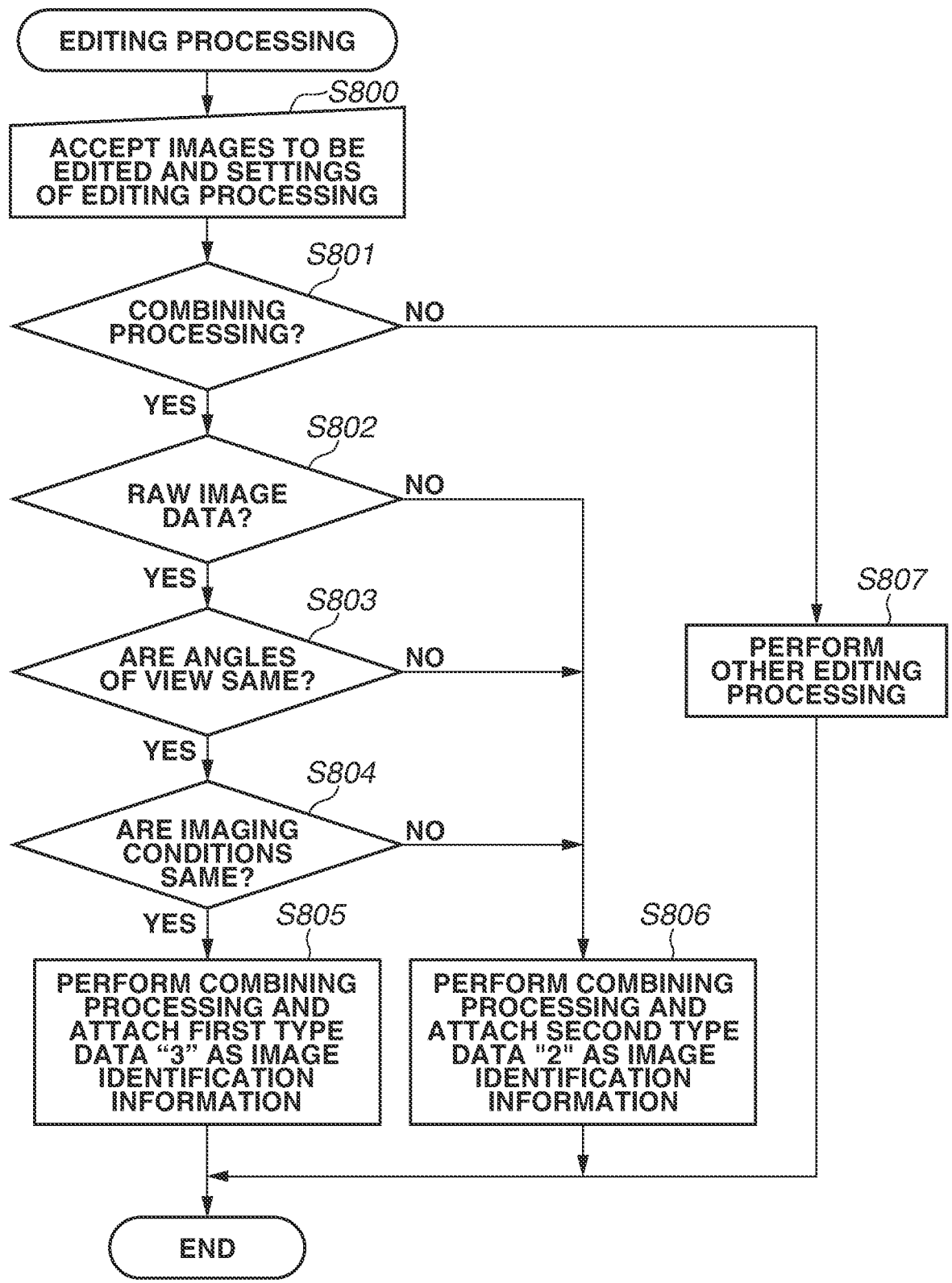
FIG. 8 is a flowchart of editing processing according to the exemplary embodiment.

In the present exemplary embodiment, the user can edit an image recorded on the recording medium 108 and displayed on the display screen and record the edited image on the recording medium 108 by operating the operation unit 111 during playback. FIG. 8 is a flowchart illustrating details of the editing processing. This flowchart is also implemented by the control unit 101 reading a program stored in the ROM 102 and performing arithmetic processing and control.

In step S800, the control unit 101 initially accepts an image to be edited and settings of editing processing from the user via the operation unit 111. By operating the operation unit 111 while viewing the display unit 109, the user selects the image to be edited from a plurality of images recorded on the recording medium 108, and further specifies editing processing to be performed on the image to be edited. The editing processing according to the present exemplary embodiment can be combining processing, trimming processing, or color conversion processing. The user selects the editing processing to be executed from among such processing options. If combining processing is specified, the user selects a plurality of images as images to be edited.

In step S801, the control unit 101 determines whether the editing processing set in step S800 is combining processing. If combining processing is to he executed as the editing processing (YES in step S801), the processing proceeds to step S802. If processing other than combining processing is to be executed (NO in step S801), the processing proceeds to step S807. In step S807, the control unit 101 executes the editing processing other than combining processing, set in step S800.

In step S802, the control unit 101 determines whether the image data on the images selected to be edited in step S800 is raw image data. If the image data is determined to be raw image data (YES in step S802), the processing proceeds to step S803. If the image data is determined not to be raw image data (NO in step S802), the processing proceeds to step S806.

In step S803, the control unit 101 determines whether the plurality of pieces of raw image data to be edited by the combining processing has the same angles of view (imaging fields of view). The purpose is to determine whether the condition for an "imaging time obtained combined image" is satisfied by combining the plurality of pieces of raw image data to be edited. In the present exemplary embodiment, if the plurality of pieces of raw image data to be edited is of images captured by continuous shooting, the control unit 101 determines that the angles of view are the same. If the angles of view are determined to be the same (YES in step S803), the processing proceeds to step S804. If the angles of view are determined not to be the same (NO in step S803), the processing proceeds to step S806. In step S804, the control unit 101 reads the imaging conditions from the plurality of pieces of raw image data to be edited by the combining processing, and determines whether the imaging conditions are the same. As described above, the imaging conditions subjected to the determination of the sameness are specific imaging conditions (such as an aperture value, an object distance, a light source, and a lens focal length) for determining an image to be classified as an "imaging time obtained combined image". If the imaging conditions of the plurality of pieces of raw image data to be edited are determined to be the same (YES in step S804), the processing proceeds to step S805. If the imaging conditions are determined not to be the same (NO in step S804), the processing proceeds to step S806.

In step S805, the control unit 101 performs the combining processing on the plurality of pieces of raw image data to be edited by using the image processing unit 107, whereby a combined image is generated. Since the generated combined image satisfies the condition for the combined image to be classified as an "imaging time obtained combined image", the control unit 101 attaches the first type data "3" as the image identification information 301 and records the combined image on the recording medium 108. Here, the combined image is recorded with not only the image identification information 301 but also other Exif information attached thereto. Since the combined image is an "imaging time obtained combined image", the combined image is recorded with the combined image information 304 and the source image information 305 about the combined image attached as well.

In step S806, the control unit 101 performs the combining processing on the plurality of pieces of image data to be edited (raw image data or developed image data) by using the image processing unit 107, whereby a combined image is generated. The control unit 101 then attaches the second type data "2" indicating a classification "general combined image" to the generated combined image as image identification information 301, and records the resultant on the recording medium 108. Here, the combined image is recorded with not only the image identification information 301 but also other Exif information attached to. Since the combined image is a "general combined image", the combined image may be recorded with or without the combined image information 304 and the source image information 305 about the combined image being attached.

As described above, in steps S803 and S804, the control unit 101 determines whether the combined image to be generated satisfies the condition for the combined image to be classified as an "imaging time obtained combined image". If the condition for the combined image to be classified as an "imaging time obtained combined image" is satisfied, the processing proceeds to step S805. If the condition is not satisfied, the processing proceeds to step S806.

If, in step S802, the image data on the images to be edited is raw image data, then the control unit 101 determines whether the condition for the combined image to be classified as "an imaging time obtained combined image" is satisfied, and attaches the image identification information 301 based on the determination result. On the other hand, if the image data is not raw image data, the control unit 101 attaches the second type data "2" indicating a "general combined image" to the generated combined image as the image identification information 301 regardless of whether the condition for the combined image to be classified as an "imaging time obtained combined image" is satisfied. The reason is as follows. Raw image data contains detailed information such as imaging conditions during imaging for the sake of development processing. Since undeveloped data obtained during imaging is recorded, combining during playback can generate a combined image equivalent to that combined during imaging. In the present exemplary embodiment, if captured images recorded on the recording medium 108 are combined and the combined image is generated by combining raw images, which type data to attach, the first type data "3" indicating an "imaging time obtained combined image" or the second type data "2" indicating a "general combined image", is switched based on whether the condition for an "imaging time obtained combined image" is satisfied. On the other hand, if the combined image is generated by combining ordinary developed images, the second type data "2" indicating a "general combined image" is attached without determining the condition, i.e., irrespective of whether the condition is satisfied.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™). a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2019-093200, filed May 16, 2019, and No. 2019-093201, filed. May 16, 2019, which are hereby incorporated by reference herein in their entirety.

What is claimed is:
1. An image processing apparatus comprising:
 a combining unit configured to combine a plurality of images to generate a combined image; and
 a control unit configured to record the combined image generated by the combining unit on a recording medium, and configured to:
 determine whether the combined image is generated by combining a plurality of captured images which has not yet been stored in the recording medium, determine whether the plurality of images used for combining during imaging have substantially the same imaging conditions for angles of view, determine whether the plurality of images used for combining during imaging do not have substantially the same imaging conditions for angles of view, wherein, in a case the combined image determined is generated by combining a plurality of captured images which has not yet been stored in the recording medium and the plurality of images used for combining during imaging have substantially the same imaging conditions for angles of view, the control unit attaches first combination classification data, as identification information that indicates classification of combination, to the recorded combined image, wherein, in a case the combined image determined is generated by combining a plurality of captured images which has not yet been stored in the recording medium and the plurality of images used for combining during imaging do not have substantially the same imaging conditions for angles of view, the control unit attaches second combination classification data, as the identification information, to the recorded combined image, and wherein, in a case the combined image determined is generated by combining a plurality of stored captured images already recorded on the recording medium, the control unit attaches the second combination classification data, as the identification information, to the recorded combined image regardless of whether the plurality of images used for combining have or do not have substantially the same imaging conditions for angles of view.

2. The image processing apparatus according to claim 1, wherein the control unit is configured to, in recording the combined image with the first type data attached thereto, control the recording so that a number of captured images used for the combining and imaging conditions of the captured images used for the combining are recorded with the first type data.

3. The image processing apparatus according to claim 1, wherein the control unit is configured to perform control so that the first type data or the second type data is recorded in a header area of image data.

4. The image processing apparatus according to claim 3, wherein the control unit is configured to perform control so that the first type data or the second type data is recorded in an application marker segment 1 (APP1) area of an image data file according to an Exchangeable image file format (Exif) standard.

5. The image processing apparatus according to claim 1, wherein the predetermined condition is that the plurality of captured images is regarded as having the same predetermined imaging conditions and angles of view during imaging.

6. The image processing apparatus according to claim 5, wherein the predetermined imaging conditions include an aperture value, an object distance, a light source, and a lens focal length.

7. The image processing apparatus according to claim 1, wherein the control unit is configured to, if the combined image, generated by the combining unit is generated by combining the plurality of captured images recorded on the recording medium, and the combined image is generated from a plurality of pieces of raw image data obtained by continuous shooting, control the recording of the combined image so that the first type data or the second type data is attached based on whether the predetermined condition is satisfied.

8. An image processing method comprising:
combining a plurality of images to generate a combined image;
recording the combined image generated on a recording medium;
determining whether the combined image is generated by combining a plurality of captured images which has not yet been stored in the recording medium,
determining whether the plurality of images used for combining during imaging have substantially the same imaging conditions for angles of view,
determining whether the plurality of images used for combining during imaging do not have substantially the same imaging conditions for angles of view, wherein, in a case the combined image determined is generated by combining a plurality of captured images which has not yet been stored in the recording medium and the plurality of images used for combining during imaging have substantially the same imaging conditions for angles of view, attach first combination classification data, as identification information that indicates classification of combination, to the recorded combined image, wherein, in a case the combined image determined is generated by combining a plurality of captured images which has not yet been stored in the recording medium and the plurality of images used for combining during imaging do not have substantially the same imaging conditions for angles of view, attach second combination classification data, as the identification information, to the recorded combined image, and wherein, in a case the combined image determined is generated by combining a plurality of stored captured images already recorded on the recording medium attach the second combination classification data, as the identification information, to the recorded combined image regardless of whether the plurality of images used for combining have or do not have substantially the same imaging conditions for angles of view.

9. A non-transitory computer-readable storage medium for storing a program to cause a computer to perform the image processing method, the method comprising:
combining a plurality of images to generate a combined image;
recording the combined image generated on a recording medium;
determining whether the combined image is generated by combining a plurality of captured images which has not yet been stored in the recording medium,
determining whether the plurality of images used for combining during imaging have substantially the same imaging conditions for angles of view,
determining whether the plurality of images used for combining during imaging do not have substantially the same imaging conditions for angles of view, wherein, in a case the combined image determined is generated by combining a plurality of captured images which has not yet been stored in the recording medium and the plurality of images used for combining during imaging have substantially the same imaging conditions for angles of view, attach first combination classification data, as identification information that indicates classification of combination, to the recorded combined image, wherein, in a case the combined image determined is generated by combining a plurality of captured images which has not yet been stored in the recording medium and the plurality of images used for combining during imaging do not have substantially the same imaging conditions for angles of view, attach second combination classification data, as the identification information, to the recorded combined image, and wherein, in a case the combined image determined is generated by combining a plurality of stored captured images already recorded on the recording medium attach the second combination classification data, as the identification information, to the recorded combined image regardless of whether the plurality of images used for combining have or do not have substantially the same imaging conditions for angles of view.

\* \* \* \* \*